US012724420B2

(12) United States Patent
Carlström

(10) Patent No.: US 12,724,420 B2
(45) Date of Patent: Sep. 1, 2026

(54) METHOD FOR DETERMINING A POSITION DEVIATION, A POSITIONING SYSTEM AND AN UNDERWATER VEHICLE

(71) Applicant: SAAB AB, Linköping (SE)

(72) Inventor: Johan Carlström, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/858,496

(22) PCT Filed: May 4, 2023

(86) PCT No.: PCT/SE2023/050434
§ 371 (c)(1),
(2) Date: Oct. 21, 2024

(87) PCT Pub. No.: WO2023/214926
PCT Pub. Date: Nov. 9, 2023

(65) Prior Publication Data

US 2025/0264877 A1 Aug. 21, 2025

(30) Foreign Application Priority Data

May 6, 2022 (SE) .................................... 2200048-3

(51) Int. Cl.
*G05D 1/242* (2024.01)
*B63G 8/00* (2006.01)
(Continued)

(52) U.S. Cl.
CPC ............. *G05D 1/242* (2024.01); *B63G 8/001* (2013.01); *G01S 5/18* (2013.01);
(Continued)

(58) Field of Classification Search
None
See application file for complete search history.

(56) References Cited

U.S. PATENT DOCUMENTS 5,357,437 A 10/1994 Polvani
2003/0078706 A1 4/2003 Larsen
2007/0106462 A1 5/2007 Blain et al.

FOREIGN PATENT DOCUMENTS

FR 3101324 A1 4/2021
WO WO 2004/088351 A1 10/2004

OTHER PUBLICATIONS

International Search Report and Written Opinion for Patent Application No. PCT/SE2023/050434, dated Jul. 18, 2023, 13 pages.
(Continued)

*Primary Examiner* — Maceeh Anwari
(74) *Attorney, Agent, or Firm* — ALSTON & BIRD LLP

(57) ABSTRACT

A method (1000) for determining a position deviation of a first node the method comprising obtaining (1110) input data, at a first and second position. Said input data comprises, an estimated position of the first node (p1) and a first velocity vector (v1) of the first node, obtaining (1120) the exact position ($p_2$*) of the second node; obtaining (1125) the emitted frequency ($f_e$) of an acoustic signal a source; (1130) receiving the acoustic signal (S) and measuring the observed frequency; calculating (1140) a second velocity vector (v12) which defines the velocity of the first node in relation to the second node; and calculating (1150), the angle (α) between the first velocity vector and the second velocity vector; determining (1160) based on the angle, the first velocity vector, and the estimated position of the first node, a line of direction (L) indicating the direction from the estimated position of the first node towards an estimated position of the second node, and determining (1300) based on a first and second line of direction an intersection point defining the estimated position of the second node ($p_2$); determining (1400) a deviation vector ($V_d$) corresponding to the difference between the estimated position of the second node and the exact position of the second node, and determining
(Continued)

Figure 1:
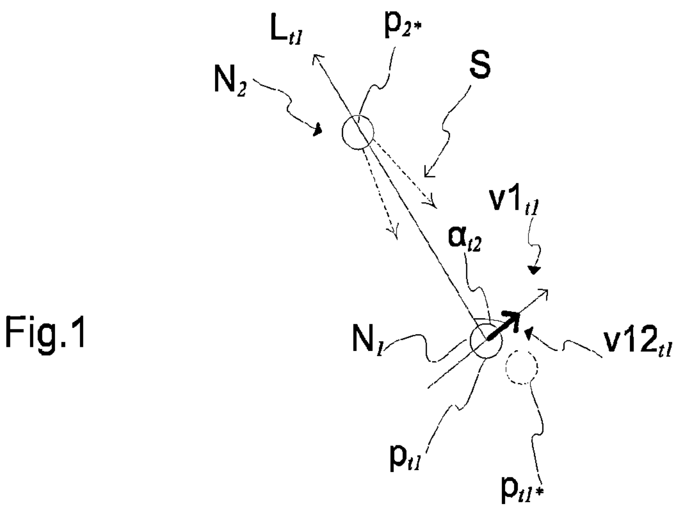

(1500) the position deviation of the first node which corresponds to the deviation vector. The disclosure further relates to a positioning system for determining a position deviation for a first node and an underwater vehicle.

9 Claims, 2 Drawing Sheets

(51) Int. Cl.
*G01S 5/18* (2006.01)
*G05D 107/00* (2024.01)
*G05D 111/20* (2024.01)

(52) U.S. Cl.
CPC .... *B63G 2008/004* (2013.01); *G01S 2201/07* (2019.08); *G05D 2107/27* (2024.01); *G05D 2111/20* (2024.01)

(56) References Cited

OTHER PUBLICATIONS

Swedish Search Report for Swedish Application No. 2200048-3, dated Dec. 23, 2022, 6 pages.

METHOD FOR DETERMINING A POSITION DEVIATION, A POSITIONING SYSTEM AND AN UNDERWATER VEHICLE

CROSS-REFERENCE TO RELATED APPLICATIONS

This application is a National Stage Application, filed under 35 U.S.C. § 371, of International Application No. PCT/SE2023/050434, filed May 4, 2023, which international application claims priority to and the benefit of Swedish Application No. 2200048-3, filed May 6, 2022; the contents of both of which as are hereby incorporated by reference in their entireties.

TECHNICAL FIELD

The present disclosure relates to a method for determining a position deviation of a first node between an estimated position and an actual position of the first node, a positioning system for determining a position deviation for a first node and an underwater vehicle. More specifically, the disclosure relates to a method for determining a position deviation of a first node between an estimated position and an actual position of the first node, a positioning system for determining a position deviation for a first node, and an underwater vehicle as defined in the introductory parts of the independent claims.

BACKGROUND ART

Underwater drones, also referred to as autonomous underwater vehicle, AUV, are used in a wide range of field's and operations under sea level, e.g., underwater data collection, and/or underwater maintenance. These different fields of interest all demand constant high precision navigational system.

A well-known problem with the underwater navigation is that the underwater vehicle, and the internal navigation system navigating the underwater vehicle, over time accumulate a deviation in positioning. Known underwater acoustic positioning systems trying to solve this problem, e.g., USBL (Ultra-Short Base Line, also known as SSBL, Super Short Base Line), LBL (Long Base Line) positioning system and SBL (Short Base Line) system has drawbacks, e.g., a limited area of use, and expensive purchase and integration in current system.

SUMMARY

It is an object of the present disclosure to mitigate, alleviate or eliminate one or more of the above-identified deficiencies and disadvantages in the prior art and solve at least the above mentioned problem.

According to a first aspect there is provided a method for determining a position deviation of a first node between an estimated position and an actual position of the first node, wherein the first node is located in a mass of water, the method comprising obtaining input data, at a first position of the first node in a first point in time, and at a second position of the first node in a second point in time, wherein the second position of the first node is a different position than the first position of the first node, and the second point in time follows the first point in time, wherein the input data comprises, an estimated position of the first node, a first velocity vector of the first node, obtaining the exact position of the second node; obtaining the emitted frequency of an acoustic signal; receiving an acoustic signal, from a second node and measuring the observed frequency of the received acoustic signal; calculating on basis of said observed frequency and said emitted frequency, a second velocity vector which defines the velocity of the first node in relation to the second node, and wherein the calculation of the second velocity vector is based on relationship between observed frequency and emitted frequency of the acoustic signal node; calculating, an angle, wherein the angle is the angle between the first velocity vector and the second velocity vector; determining, based on the angle, the first velocity vector, and the estimated position of the first node, a line of direction, wherein the line of direction indicates the direction from the estimated position of the first node towards an estimated position of the second node, and based on the obtained measurements, the method further comprises; determining, based on a first line of direction and a second line of direction, an intersection point defining the estimated position of the second node; determining a deviation vector which corresponds to the difference between the estimated position of the second node, and the exact position of the second node, and determining the position deviation of the first node, wherein the position deviation of the first node corresponds to the deviation vector.

In one example embodiment, the deviation vector comprise the different between the coordinates. For example, in a 2D coordinate system, the deviation vector comprise the different between an x-coordinate and a y-coordinate. In other words, the different on the x-axis and the different on the y-axis of the estimated position of the second node and the exact position of the second node.

In another example, the coordinate system is a 3D coordinate system comprises the different in all three dimensions.

The method may further comprise determining a positon deviation of the first node, and using said positon deviation to update the position of the estimated position of the first node to an actual position of the first node. This has the advantage of determining an actual position of a first node, using only one other node as a reference.

In the step of determining (1300), based on a first line of direction ($L_{t1}$) and a second line of direction ($L_{t2}$), an intersection point defining the estimated position of the second node ($p_2$). The first line of direction ($L_{t1}$) is determined at a first position ($P_{t1}$) of the first node at a first point in time ($t_1$), and the second line of direction ($L_{t2}$) is determined at a second position ($P_{t2}$) of the first node at a second point in time ($t_2$).

According to one example, the emitted frequency may be obtained directly from the source of the acoustic signal using for instance acoustic communication, obtained indirectly from another node, or obtained in advance and stored in a database.

According to some embodiments, the first node is an underwater vehicle.

According to some embodiments, the determining of the intersection point comprises use of a statistical model, which combines the lines of direction into an intersection point.

This is advantageous since a statistical model, e.g., a likelihood function can be used for determining an intersection point of said line of directions even in the case that the line of directions does not perfectly intersect each other. In the case of a plurality of lines of direction wherein at least some lines of direction do not cross each other in an intersection region, e.g., the region in which the intersection point may be expected, a mathematical method may be at great assistance in order to determine such an intersection point. In fact, the lines of direction will most likely not unambiguously converge to the position of the second node, but rather be spread out based on the error of the estimation of the velocity of the first node and/or the position of the first node, and/or error in estimating the second velocity vector i.e., the estimation of the Doppler shift. This problem is thereby handle by a statistical model, e.g., the likelihood function.

According to some embodiments, an acoustic signal, from the second node, further comprises that the first node is the source of the acoustic signal, wherein the obtained acoustic signal from the second node is a reflection of the acoustic signal emitted by the first node.

This is advantageous when the second node, for whatever reason, does not emit an acoustic signal. This could be the case when the second node is broken, or simply not configured to emit an acoustic signal, but rather configured to reflect such signals.

According to some embodiments, the exact position of the second node is obtained from the second node, a third node, and/or from a database.

The exact position of the second node may be obtained in many different ways. In one example, the exact position of the second node is received from the second node. The exact position of the second node may thereafter be stored in a database and thereby be retrieved when needed. In another example, the exact position of the second node is received from a third node. The third node may be any type of node. The third node may be of the same or similar type as the first node. For example, the third node may be an identical node as the first node, sharing same or similar assignment in the same region, e.g., performing maintenance of surveillance on an underwater base or underwater operation. The third node may then share the exact position of the second node with neighboring nodes, i.e. the first node. The third may also be of a completely different type, for example the third node may be a surface vehicle, e.g., a boat, vessel, or an airborne vehicle, e.g., a, autonomous unmanned vehicle, airplane or helicopter. In another example, the first node obtains, and stores in a database, the exact location in advance.

In the case wherein the exact position of the second node is displaced, the first node may get an updated exact position of the second node by a neighboring node, e.g., a third node.

According to some embodiments, the position of the second node is fixed. This is advantageous, since the need for updating the exact position of the second node is thereby eliminated. However, in the case the position of the second node is changed, a communication network among nodes may share said new exact position of the second node.

According to a second aspect there is provided a positioning system for determining a position deviation for a first node, wherein the positioning system comprises a positioning unit for estimating a position of the first node, means for receiving an acoustic signal and for measuring the frequency thereof, means for determining a first velocity vector of the first node, processing means, configured to execute the method according to the first aspect.

According to a third aspect there is provided an underwater vehicle, characterized in that it comprises a positioning system according to the second aspect. This is advantageous, since the positioning system can be used in accurate and underwater maintenance, operation, and surveillance systems, which demand high positioning accuracy.

According to some embodiments, the first node is an autonomous underwater vehicle.

This is advantageous, enabling the positioning system to be used in dangerous situations, e.g., longtime operation underwater, demanding high accuracy.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology

The exact position of the first node, denoted $p_{t1}$*, $p_{t2}$*, $p_{tn}$*, is the actual position of the first node in a given point in time. The exact position of the first node is at some point in time unknown, and therefore desired to determining. The determining of said exact position of the first node is determined by the method disclosed in this application.

The estimated first position of the first node in a first point in time, and the second position of the first node in a second point in time, are denoted $p_{t1}$ and $p_{t1}$ respectively. They refer to a position of the first node in different period of times. For example, in relation to FIG. 2, the n'th position of the first node in an n'th point in time is denoted $p_{tn}$ and $t_n$ respectively.

The exact position of the second node, denoted $p_2$*, is the actual position of the second node. This position is known by the method and the positioning system. The exact position of the second node is determined by means outside the scope of this invention/application.

The term estimated position of the second node, denoted $p_2$, is the position of the second node according to the claimed method and positioning system. The object of determining the estimated position of the second node is solely for determining the deviation between said estimated position and the exact position of the second node.

The term first velocity vector, denoted v1$_{t1}$, v1$_{t2}$, v1$_{tn}$, is a vector at the point in time $t_1$, $t_2$, $t_n$ respectively and comprising the velocity, e.g., the speed and direction of movement in all directions of the first node.

The term second velocity vector, denoted v12$_{t1}$, v12$_{t2}$, v12$_{tn}$, is a vector at the point in time $t_1$, $t_2$, $t_n$ respectively comprising the velocity of the first node in relation to the second node, e.g., the speed and direct of movement in all direction of the first node in relation to the second node. In other words, the second velocity vector defines the change of the distance between the first node and the second node with respect to time. For example, if the first node is circulating perfectly around the second node, the change of distance between the first and second node is zero, and the therefore the velocity of the first node in relation to the second node is zero as well. However, if the first node is moving in a direct direction towards the second node, or in the opposite direction of the second node, the change in distance with respect to time is the speed of the first node in the corresponding direction.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

Figure 2:
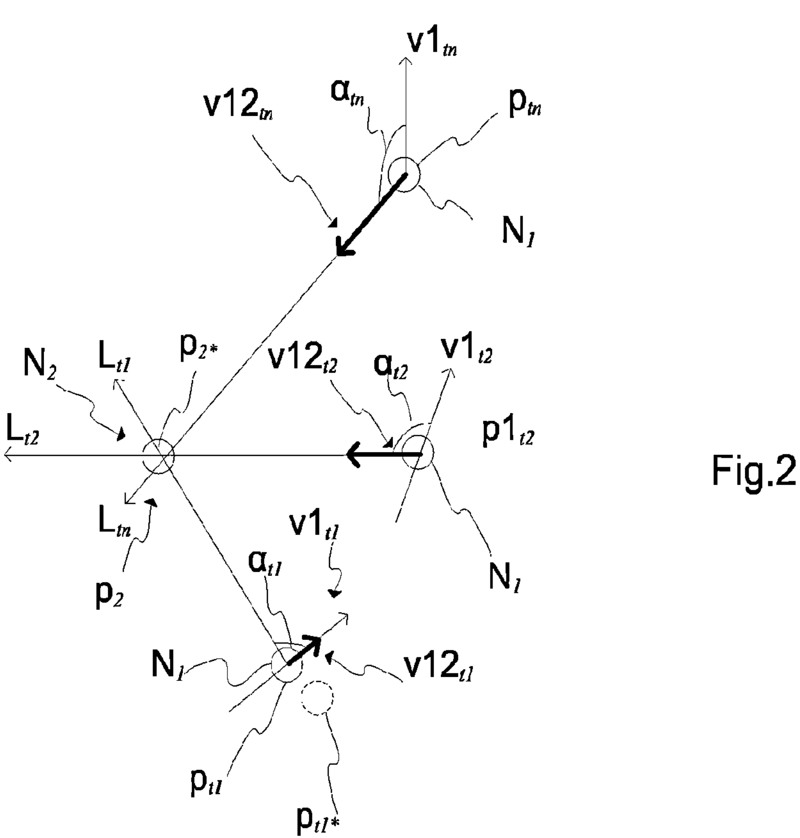

FIGS. 1-2 schematically illustrates a first node in navigational communication with a second node according to some embodiments of the present disclosure.

Figure 3:
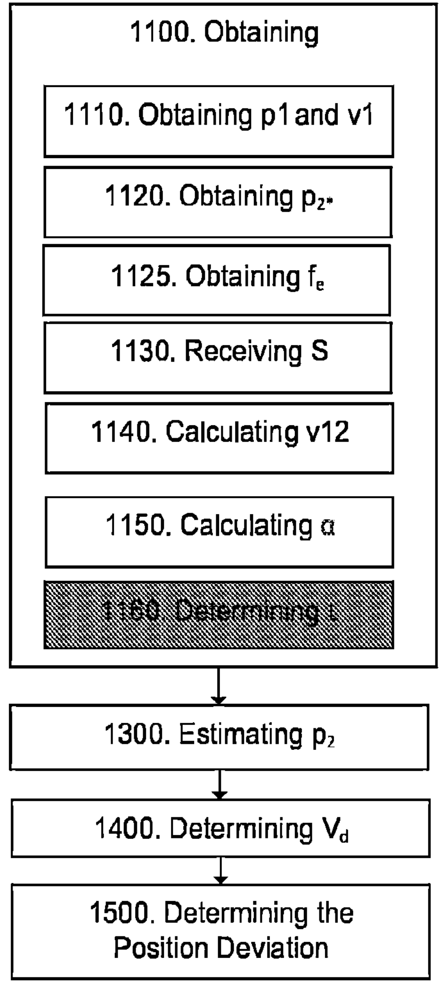

FIG. 3 is a flowchart depicting embodiments of a method according to some embodiments of the present disclosure.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The claimed method, and positioning system take place during a plurality of subsequent point in times $t_1$, $t_2$, $t_n$ later shown in FIG. 2. However, for ease of understanding the basics of the application, FIG. 1 aim to illustrate the basic concept of the method, and the positioning system and show what is happening during a first point in time $t_1$.

FIG. 1 shows, for a first point in time $t_1$, a first node $N_1$ located in a first position $p_{t1}$ during said first point in time $t_1$. The first node $N_1$ is having a first velocity vector $v\mathbf{1}_{t1}$ which represents the momentary rate of change of the distance travelled by said first node $N_1$. The magnitude of the first velocity vector $v\mathbf{1}_{t1}$ gives the speed of the first node $N_1$ while the vector direction gives the direction of the first node $N_1$.

FIG. 1 also shows, for the same first point in time $t_1$, a second node $N_2$ located in a second position $p_2$*, wherein the position of the second node $p_2$* is the exact position of the second node $N_2$, i.e., not an estimated position.

Shown is an acoustic signal S receivable by the first node $N_1$, and based on said signal S and the use of Doppler shift (more about the use of Doppler shift in relation to FIG. 3, which discloses the method in detail), a second velocity vector $v\mathbf{12}_{t1}$ can be determined. The second velocity vector $v\mathbf{12}_{t1}$ defines the relative velocity of the first node $N_1$ in relation to the second node $N_2$.

On basis of the first velocity vector v1$t_1$, and the second velocity vector $v\mathbf{12}_{t1}$, an angle $\alpha_{t1}$ is calculated (i.e., the angle between the first velocity vector and the second velocity vector). Further, on basis on said an angle $\alpha_{t1}$ and said first velocity vector $v\mathbf{1}_{t1}$ a line of direction $L_{t1}$, wherein the line of direction $L_{t1}$ indicates the direction from the estimated position of the first node $p_{t1}$ towards an estimated position of the second node $p_2$.

In relation to FIGS. 2 and 3, it will be shown how the use of a plurality of lines of direction $L_{t1}$, $L_{t2}$, $L_{tn}$ is used to determine an intersection point which is used to determine the estimated position of the second node $p_2$, and further to determine the position deviation between the estimated position of the second node ($p_2$) and the exact position of the second node ($p_2$*). Said position deviation, corresponds to the position deviation of the first node $N_1$, i.e., the difference between the estimated position of the first node $p_{t1}$ and the actual position of the first node $p_{t1}$*.

FIG. 2 shows an extended view compared to the view shown in relation to FIG. 1. FIG. 2 further shows the first node $N_1$ located at three different positions, $p\mathbf{1}_{t1}$ $p\mathbf{1}_{t2}$ $p\mathbf{1}_{tn}$, at three different point in times, $t_1$, $t_2$, $t_n$, and the figure shows how each line of direction, $L_{t1}$, $L_{t2}$, Lin, together can indicate the estimated position of the second node.

As illustrated in relation to the figure, the lines of direction, $L_{t1}$, $L_{t2}$, $L_{tn}$, constitute an intersection point defining the estimated position of the second node $p_2$. On basis on said estimated position of the second node $p_2$, a deviation vector $V_d$ (not shown) which corresponds to the difference between the estimated position of the second node $p_2$, and the exact position of the second node $p_2$* can be determined. Further, the deviation vector, $V_d$ also corresponds to the position deviation of the first node.

FIG. 2 shows an n'th position $p_{tn}$ of the first node in an n'th point in time $t_n$. The n'th position of the first node aims to illustrate that the method is an ongoing procedure which for a plurality of point in times during the performing of said method.

Examples of embodiments of a method 1000 for determining a position deviation of a first node $N_1$ between an estimated position p1 and an actual position of the first node p1*, will now be described with reference to the flowchart depicted in FIG. 3.

FIG. 3 is an illustrated example of steps or operations, which may be taken by the method 1000. The first aspect of this disclosure shows a method 1000 for determining a position deviation of a first node $N_1$ between an estimated position $p_{t1}$ and an actual position of the first node $p_{t1}$*. The first node $N_1$ is located in a mass of water. The method comprises the following operations:

Obtaining input data 1110, at a first position $p_{t1}$ of the first node in a first point in time $t_1$, and at a second position $p_{t2}$ of the first node in a second point in time $t_2$. The second position of the first node $p\mathbf{1}_{t2}$ is a different position than the first position of the first node $p\mathbf{1}_{t1}$, and the second point in time t2 follows the first point in time $t_1$. The input data comprises, an estimated position of the first node $p\mathbf{1}_{t1}$, $p\mathbf{1}_{t2}$, and a first velocity vector $v\mathbf{1}_{t1}$, $v\mathbf{1}_{t2}$ of the first node $N_1$, Obtaining 1120 the exact position of the second node $p_2$*. A preferred way of obtaining the exact position of the second node $p_2$* is, from the second node $N_2$, and by use of acoustic underwater communication. This communication is not illustrated in the figure.

Obtaining 1125 the emitted frequency $f_e$ of an acoustic signal. A preferred way of obtaining the emitted frequency $f_e$ of an acoustic signal is, from the second node $N_2$, and by use of acoustic underwater communication. This communication is not illustrated in the figure.

Receiving 1130 an acoustic signal S, from a second node $N_2$ and measuring the observed frequency fo of the received acoustic signal S.

Calculating 1140 on basis of on basis of said observed frequency $f_o$ and said emitted frequency $f_e$, a second velocity vector $v\mathbf{12}_{t1}$, $v\mathbf{12}_{t2}$ which defines the velocity of the first node in relation to the second node. The calculation of second velocity vector $v\mathbf{12}_{t1}$, $v\mathbf{12}_{t2}$ is based the on relationship between observed frequency fo and the emitted frequency $f_e$ of the acoustic signal S. In other words, the calculation of the second velocity vector $v12_{t1}$, $v12_{t2}$ is based on Doppler shift, sometimes referred to as the Doppler effect. The observant reader would recognize that it takes a period of time, not merely a momentary point in time, to obtain the measurements of the Doppler shift, and thereby the second velocity vector v12. The explicit calculation of the second velocity vector v12 is not within the scope of this application. In this application, the second velocity vector v12 is determined at different point in times, $t_1$, $t_2$, $t_n$, however the calculations and measurements in order determining the Doppler shift is performed over a period of time.

Calculating 1150, an angle $\alpha_{t1}$, $\alpha_{t2}$, wherein the angle $\alpha_{t1}$, $\alpha_{t2}$ is the angle between the first velocity vector v1 and the second velocity vector v12.

Determining 1160, based on the angle $\alpha_{t1}$, $\alpha_{t2}$, the first velocity vector $v1_{t1}$, $v1t_2$, and the estimated position of the first node $p1_{t1}$, $p1_{t2}$, a line of direction $L_{t1}$, $L_{t2}$, wherein the line of direction $L_{t1}$, $L_{t2}$ indicates the direction from the estimated position of the first node p1,$Pt_1$,$P_{t2}$ towards an estimated position of the second node $p_2$*.

Determining 1300, based on a first line of direction $L_{t1}$ and a second line of direction $L_{t2}$, an intersection point defining the estimated position of the second node $p_2$.

Determining 1400 a deviation vector $V_d$ which corresponds to the difference between the estimated position of the second node $p_2$, and the exact position of the second node $p_2$*.

Determining 1500 the position deviation of the first node, wherein the position deviation of the first node corresponds to the deviation vector $V_d$.

In some embodiments, the determining of the intersection point comprises use of a statistical model, which combines the lines of direction $L_{t1}$, $L_{t2}$ into an intersection point.

In some embodiments, an acoustic signal S, from the second node $N_2$, further comprises that the first node is the source of the acoustic signal S, wherein the obtained acoustic signal S from the second node is a reflection of the acoustic signal S reflected by the second node.

In some embodiments, the exact position of the second node $p_2$* is obtained from the second node, a third node, and/or from a database.

In some embodiments, the position of the second node is fixed.

The second aspect of this disclosure shows a positioning system configured to perform the first aspect (as disclosed hereinabove) for determining a position deviation for a first node $N_1$, wherein the positioning system 2000 comprises a positioning unit for estimating the position of the first node, means for receiving an acoustic signal and for measuring the frequency thereof, means for determining a first velocity vector of the first node, and processing means, configured to execute the method according to any of the first aspect. The processing means is thus configured to obtain the data used in the method disclosed hereinabove, and to perform the calculations that are part of the method in order to determine the position deviation of the first node.

The third aspect of this disclosure shows an underwater vehicle, characterized in that it comprises a positioning system according to the second aspect as disclosed hereinabove.

In some embodiments, the first node is an autonomous underwater vehicle.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A method (1000) for determining a position deviation of a first node ($N_1$) between an estimated position (p1) and an actual position of the first node (p1*), wherein the first node ($N_1$) is located in a mass of water, the method comprising:

obtaining input data (1110), at a first position ($P_{t1}$) of the first node at a first point in time ($t_1$), and at a second position ($P_{t2}$) of the first node at a second point in time ($t_2$), wherein the second position of the first node ($p1_{t2}$) is a different position than the first position of the first node ($p1_{t1}$), and the second point in time ($t_2$) follows the first point in time ($t_1$), wherein said input data comprises: an estimated position of the first node ($p1_{t1}$,$p1_{t2}$), and a first velocity vector ($v1_{t1}$,$v1_{t2}$) of the first node ($N_1$), obtaining (1120) the exact position of the second node ($p_2$*);

generating an acoustic signal(S) from a source at the first node ($N_1$);

obtaining (1125) the emitted frequency ($f_e$) of the acoustic signal at the first node ($N_1$);

receiving (1130) a reflection of the acoustic signal(S) from a second node ($N_2$) and measuring the observed frequency ($f_o$) of the reflected acoustic signal(S);

calculating (1140) on basis of said observed frequency ($f_o$) and said emitted frequency ($f_e$), a second velocity vector ($v12_{t1}$, $v12_{t2}$) which defines the velocity of the first node in relation to the second node;

calculating (1150), an angle ($\alpha_{t1}$,$\alpha_{t2}$), wherein the angle ($\alpha_{t1}$, $\alpha_{t2}$) is the angle between the first velocity vector ($v12_{t1}$, $v12_{t2}$) and the second velocity vector ($v12_{t1}$, $v12_{t2}$); and determining (1160), based on the angle ($\alpha_{t1}$, $\alpha_{t2}$), the first velocity vector ($v1_{t1}$, $v1_{t2}$), and the estimated position of the first node ($p1_{t1}$,$p1_{t2}$), a line of direction ($L_{t1}$, $L_{t2}$), wherein the line of direction ($L_{t1}$,$L_{t2}$) indicates the direction from the estimated position of the first node (p1,$P_{t1}$,$P_{t2}$) towards an estimated position of the second node ($p_2$*); and based on the obtained measurements (1100) further:

determining (1300), based on a first line of direction ($L_{t1}$) and a second line of direction ($L_{t2}$), an intersection point defining the estimated position of the second node ($p_2$);

determining (1400) a deviation vector ($V_d$) which corresponds to the difference between the estimated position of the second node ($p_2$) and the exact position of the second node ($p_2$*), and determining (1500) the position deviation of the first node, wherein the position deviation of the first node corresponds to the deviation vector ($V_d$); and based upon said determined position deviation of the first node and using only the second node as reference, updating the estimated position of the first node (p1,$P_{t1}$,$P_{t2}$) to an actual position of the first node.

2. The method (1000) according to claim 1, wherein the first node is an underwater vehicle.

3. The method (1000) according to claim 1, wherein the determining of the intersection point comprises use of a statistical model, which combines the lines of direction ($L_{t1}$, $L_{t2}$) into an intersection point.

4. The method (1000) according to claim 1, wherein an acoustic signal(S), from the second node ($N_2$) further comprises that the first node is the source of the acoustic signal(S), wherein the obtained acoustic signal(S) from the second node is a reflection of the acoustic signal(S) reflected by the second node.

5. The method (1000) according to claim 1, wherein the exact position of the second node ($p_2$*) is obtained from the second node, or a third node, or from a database.

6. The method (1000) according to claim 1, wherein the position of the second node is fixed.

7. A positioning system (2000) for determining a position deviation for a first node ($N_1$), wherein the positioning system (2000) comprises:

a positioning unit for estimating a position of the first node, means for receiving an acoustic signal and for measuring the frequency thereof, means for determining a first velocity vector of the first node, and processing means configured for:

obtaining input data (1110), at a first position ($P_{t1}$) of the first node at a first point in time ($t_1$), and at a second position ($P_{t2}$) of the first node at a second point in time ($t_2$), wherein the second position of the first node ($p1_{t2}$) is a different position than the first position of the first node ($p1_{t1}$), and the second point in time ($t_2$) follows the first point in time ($t_1$), wherein said input data comprises: an estimated position of the first node ($p1_{t1}$,$p1_{t2}$), and a first velocity vector ($v1_{t1}$,$v1_{t2}$) of the first node ($N_1$), obtaining (1120) the exact position of the second node ($p_2$*);

generating an acoustic signal(S) from a source at the first node ($N_1$);

obtaining (1125) the emitted frequency ($f_e$) of the acoustic signal at the first node ($N_1$);

receiving (1130) a reflection of the acoustic signal(S) from a second node ($N_2$) and measuring the observed frequency ($f_o$) of the reflected acoustic signal(S);

calculating (1140) on basis of said observed frequency ($f_o$) and said emitted frequency ($f_e$), a second velocity vector ($v12_{t1}$, $v12_{t2}$) which defines the velocity of the first node in relation to the second node;

calculating (1150), an angle ($\alpha_{t1}$,$\alpha_{t2}$), wherein the angle ($\alpha_{t1}$,$\alpha_{t2}$) is the angle between the first velocity vector ($v1_{t1}$,$v1_{t2}$) and the second velocity vector ($v12_{t1}$, $v12_{t2}$); and determining (1160), based on the angle ($\alpha_{t1}$,$\alpha_{t2}$), the first velocity vector ($v1_{t1}$, $v1_{t2}$), and the estimated position of the first node ($p1_{t1}$,$p1_{t2}$), a line of direction ($L_{t1}$,$L_{t2}$), wherein the line of direction ($L_{t1}$,$L_{t2}$) indicates the direction from the estimated position of the first node ($p1$,$P_{t1}$,$P_{t2}$) towards an estimated position of the second node ($p_2$*); and based on the obtained measurements (1100) further:

determining (1300), based on a first line of direction ($L_{t1}$) and a second line of direction ($L_{t2}$), an intersection point defining the estimated position of the second node ($p_2$);

determining (1400) a deviation vector ($V_d$) which corresponds to the difference between the estimated position of the second node ($p_2$) and the exact position of the second node ($p_2$*), and determining (1500) the position deviation of the first node, wherein the position deviation of the first node corresponds to the deviation vector ($V_d$); and based upon said determined position deviation of the first node and using only the second node as reference, updating the estimated position of the first node ($p1$,$P_{t1}$,$P_{t2}$) to an actual position of the first node.

8. An underwater vehicle comprising a positioning system (2000) for determining a position deviation for a first node ($N_1$), wherein the positioning system (2000) comprises:

a positioning unit for estimating a position of the first node, means for receiving an acoustic signal and for measuring the frequency thereof, means for determining a first velocity vector of the first node, and processing means configured for:

obtaining input data (1110), at a first position ($P_{t1}$) of the first node at a first point in time ($t_1$), and at a second position ($P_{t2}$) of the first node at a second point in time ($t_2$), wherein the second position of the first node ($p1_{t2}$) is a different position than the first position of the first node ($p1_{t1}$), and the second point in time ($t_2$) follows the first point in time ($t_1$), wherein said input data comprises: an estimated position of the first node ($p1_{t1}$,$p1_{t2}$), and a first velocity vector ($v1_{t1}$,$v1_{t2}$) of the first node ($N_1$), obtaining (1120) the exact position of the second node ($p_2$*);

generating an acoustic signal(S) from a source at the first node ($N_1$);

obtaining (1125) the emitted frequency ($f_e$) of the acoustic signal at the first node ($N_1$);

receiving (1130) a reflection of the acoustic signal(S) from a second node ($N_2$) and measuring the observed frequency ($f_o$) of the reflected acoustic signal(S);

calculating (1140) on basis of said observed frequency ($f_o$) and said emitted frequency ($f_e$), a second velocity vector ($v12_{t1}$, $v12_{t2}$) which defines the velocity of the first node in relation to the second node;

calculating (1150), an angle ($\alpha_{t1}$,$\alpha_{t2}$), wherein the angle ($\alpha_{t1}$,$\alpha_{t2}$) is the angle between the first velocity vector ($v1_{t1}$,$v1_{t2}$) and the second velocity vector ($v12_{t1}$, $v12_{t2}$); and determining (1160), based on the angle ($\alpha_{t1}$, 012), the first velocity vector ($v1_{t1}$, $v1_{t2}$), and the estimated position of the first node ($p1_{t1}$,$p1_{t2}$), a line of direction ($L_{t1}$,$L_{t2}$), wherein the line of direction ($L_{t1}$,$L_{t2}$) indicates the direction from the estimated position of the first node ($p1$,$P_{t1}$,$P_{t2}$) towards an estimated position of the second node ($p_2$*); and based on the obtained measurements (1100) further:

determining (1300), based on a first line of direction ($L_{t1}$) and a second line of direction ($L_{t2}$), an intersection point defining the estimated position of the second node ($p_2$);

determining (1400) a deviation vector ($V_d$) which corresponds to the difference between the estimated position of the second node ($p_2$) and the exact position of the second node ($p_2$*), and determining (1500) the position deviation of the first node, wherein the position deviation of the first node corresponds to the deviation vector ($V_d$); and based upon said determined position deviation of the first node and using only the second node as reference, updating the estimated position of the first node ($p1, P_{t1}, P_{t2}$) to an actual position of the first node.

9. The underwater vehicle according to claim 8, wherein the first node is an autonomous underwater vehicle.

* * * * *